(12) United States Patent
Huang (10) Patent No.: US 7,224,658 B2
(45) Date of Patent: May 29, 2007

(54) ADJUSTING METHOD FOR A SYNC SIGNAL IN AN OPTICAL STORAGE DEVICE

(75) Inventor: Yi-Chih Huang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 1147 days.

(21) Appl. No.: 10/123,144

(22) Filed: Apr. 17, 2002

(65) Prior Publication Data

US 2002/0186720 A1    Dec. 12, 2002

(30) Foreign Application Priority Data

Jun. 12, 2001    (TW) .............................. 90114212 A (51) Int. Cl.
*G11B 7/00*    (2006.01)
*G11B 5/09*    (2006.01)
(52) U.S. Cl. ................ 369/53.34; 369/47.28
(58) Field of Classification Search ............ 369/47.28, 369/47.3, 53.34; 360/41, 45
See application file for complete search history.

(56) References Cited

U.S. PATENT DOCUMENTS 6,236,631 B1 *   5/2001   Deguchi et al. ......... 369/53.34
6,536,011 B1 *   3/2003   Jang et al. ................. 714/814

* cited by examiner

*Primary Examiner*—William Korzuch
*Assistant Examiner*—Adam R. Giesy
(74) *Attorney, Agent, or Firm*—Rabin & Berdo, P.C.

(57) ABSTRACT

An adjusting method for a synchronous signal in an optical storage device is disclosed. The optical storage device produces a predetermined synchronous signal, and the predetermined synchronous signal normally is matched with the data synchronous signal of the data on the optical disc. The predetermined synchronous signal includes a number of predetermined synchronous impulses, and the data synchronous signal includes a number of data synchronous impulses. In the method, when the data synchronous signal is not matched to the predetermined synchronous signal, it is searched that whether or not a data synchronous impulse is outside of the predetermined window and another consecutive data synchronous impulse detected later by a distance of an image frame is detected. Also and, according to the data synchronous impulse, the predetermined synchronous impulse is adjusted, so that the data synchronous impulse is matched with the predetermined synchronous impulse. The method can improve the function to successfully read the optical disc having the data gap.

13 Claims, 6 Drawing Sheets

ADJUSTING METHOD FOR A SYNC SIGNAL IN AN OPTICAL STORAGE DEVICE

This application incorporates by reference of Taiwan application Serial No. 090114212, filed Jun. 12, 2001.

BACKGROUND OF THE INVENTION

1. Field of the Invention

This invention is related to an adjusting method for a synchronous (sync) signal in an optical storage device, and more particularly is relating to an adjusting method for a sync signal in an optical storage device, used for searching for the synchronous impulses between windows.

2. Description of Related Art

In the recent years, related technologies for the optical industry is continuously developed. Taking the re-writable CD (CD-R/RW) drive as an example, the recording speed is improved rapidly. Moreover, the rewriting speed has been improved to 10 speed (10×), 12×, or even higher. However in the practical case, if the ability for recording/rewriting the optical disc in higher speed is desired to have full performance, it still has a point in technology to overcome. That is the issue of buffer under run.

About the situation of buffer under run in simple speaking, it means that the speed of data flowing out from the buffer is larger than the speed of data flowing into the buffer. During recording/rewriting the optical disc, data transferred from a host machine (for example, a personal computer) is stored into a buffer in the re-writable CD drive. The pick-up head of the re-writable CD drive will then record data onto the optical disc according to data stored in the buffer. Since the data transmitting speed from the computer is not constant, data stored in the buffer maybe be almost full in sometime and almost empty in other time. If the data transmitting speed from the computer is not sufficiently fast, the amount of data stored in the buffer decreases. When the amount of data stored in the buffer decreases under a threshold level, the re-writable CD drive will encounter a bad situation that there is no enough data for recording. This phenomenon is called the buffer under run. When the above situation occurs, recording data on to the optical disc is suddenly interrupted. This causes a failure of writing, and may cause a bad or defect disc.

If the computer executes other application programs during recording data on the re-writable CD, the data transmission speed from the computer to the rewritable CD drive may be negatively affected. As a result, the user often encounters the situation of buffer under run and even, a failure is occurred in recording CD. In general, a technology for preventing buffer under run, BURN-Proof or Just-Link, is proposed to avoid the above issue. This technology is briefly described as follows. When the amount of data stored in the buffer is reduced under to a threshold level, the re-writable CD drive will stop writing data onto the CD. At this time, the re-writable CD drive still continuously receives data transmitted from the computer and stores data into the buffer. When the buffer is accumulated enough, the re-writable CD drive is reactivated to record data on the disk at the location that the previous recording is terminated. From the above descriptions, it can be understood that via the BURN-proof or Just-Link technology, the probability about failure in recording disc is therefore reduced.

If the function of BURN-Proof technology is used during rewriting on the optical disc, a data gap between the previous recording location and the next recording location is generated. The length of this data gap is extremely small and related to the recording speed. For example, if the re-writable CD drive records data at 1× speed, then the data gap is about 40 microns. The data gap produced by the BURN-Proof technology will cause data on the optical disc to be discontinuous. This data gap will therefore also affect the synchronous signal with respect to data stored on the optical disc.

Figure 1A:
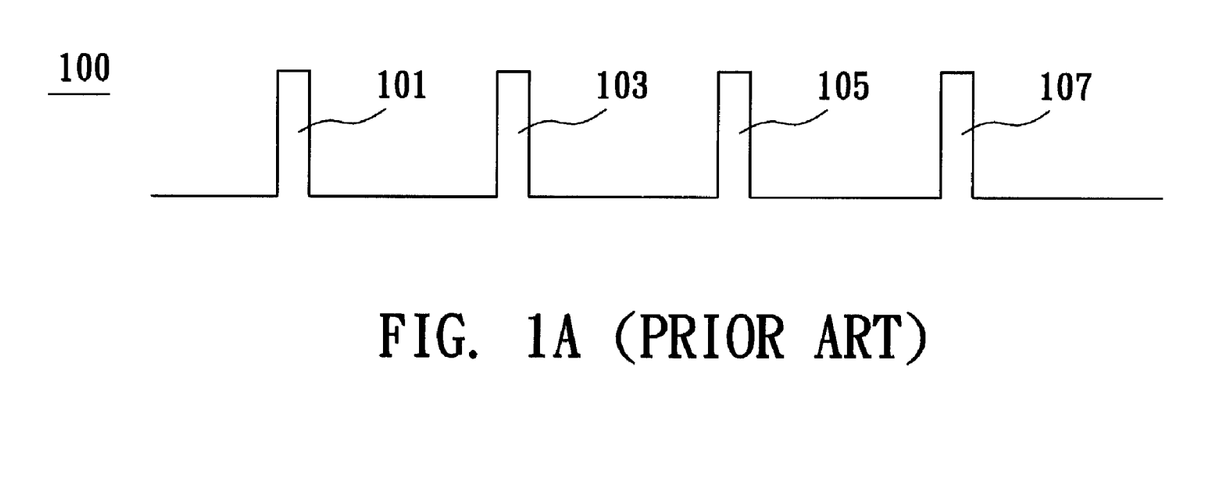
FIG. 1A schematically illustrates the synchronous signal with respect to the data stored on the optical disc without a data gap.
Figure 1B:
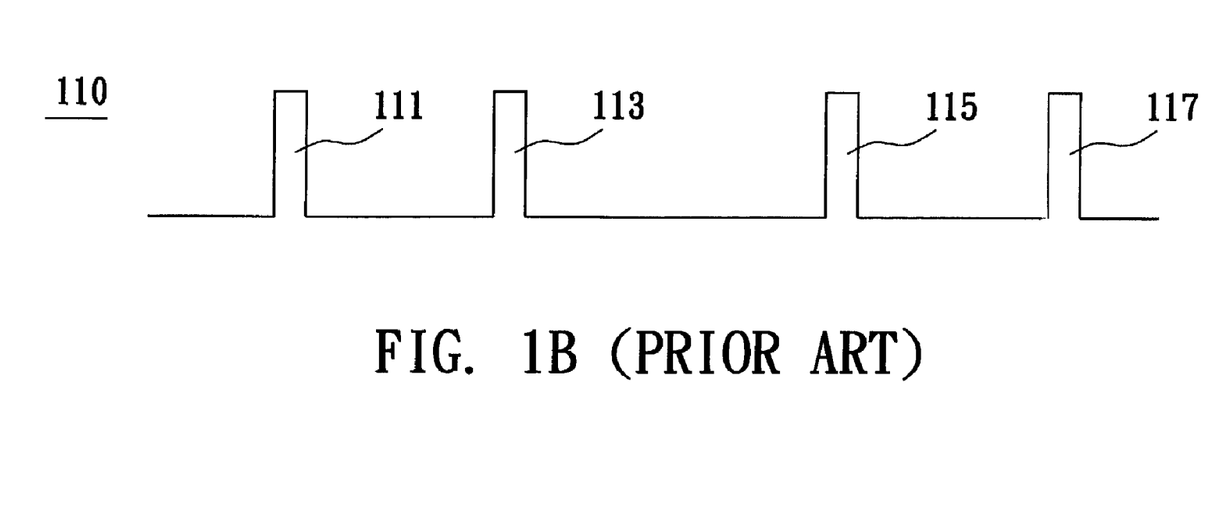
FIG. 1B schematically illustrates the synchronous signal with respect to the data stored on the optical disc with the data gap.

Referring to FIG. 1A that schematically illustrates the synchronous signal with respect to data stored on the optical disc without data gap. As shown in FIG. 1A, the synchronous signal 100 with respect to data on the optical disc without data gap is composed of a sequence of regular impulses. For example, the synchronous impulse 101 has a distance to the synchronous impulse 103 by an image frame, such as 588 T. In the same way, the synchronous impulse 103 has a distance to the synchronous impulse 105 by an image frame (588 T). Referring to FIG. 1B that schematically illustrates the synchronous signal with respect to data stored on the optical disc with a data gap. As shown in FIG. 1B, data between the synchronous impulse 111 and the synchronous impulse 113 is not interrupted by a data gap. Therefore, the distance between the two synchronous impulses 111 and 113 is equal to 588 T. However, a data gap exists between the two synchronous impulses 113 and 115 as shown in FIG. 1B. The data gap will cause the synchronous impulse 115, which is ideally expected to appear after the synchronous impulse 113 by 588 T, is then delayed. As a result, the distance between the synchronous impulse 113 and the synchronous impulse 115 is larger than 588 T. Then, since there is no data gap between the synchronous impulses 115 and 117, the distance between the synchronous impulses 115 and 117 is normal.

When the optical storage device, such as a CD-ROM drive, is reading data from the disc, the synchronous signal from the optical disc drive and the synchronous signal with respect to the information stored on the optical disc are compared for match. If the comparison result is that these two synchronous signals is matched, data stored on the optical disc then is decoded or read normally. In addition, the relation between the synchronous impulses is described as follows.

Figure 2:
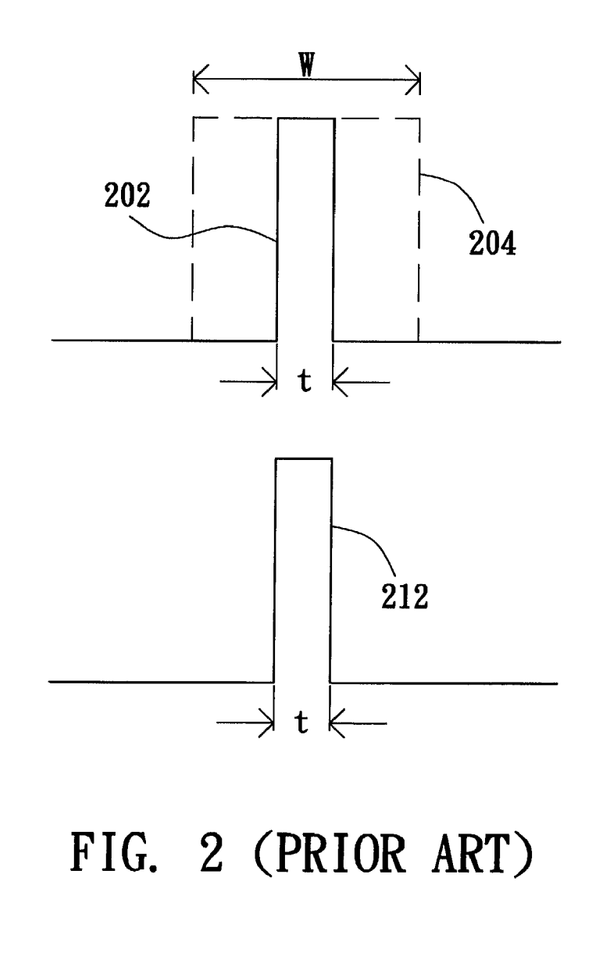
FIG. 2 schematically illustrates a relation between the predetermined synchronous impulses from the optical disc drive and the data synchronous impulses with respect to data stored on the optical disc.

Referring to FIG. 2 that schematically illustrates a relation between the data synchronous impulses on the optical disc and predetermined synchronous impulses from the optical disc drive. As shown in FIG. 2, a predetermined synchronous impulse 202 (from the optical disc drive) and a data synchronous impulse 212 (from the disk) both have a width of t. Basically, when the predetermined synchronous impulse 202 and the data synchronous impulse 212 appear almost at the same time, these two synchronous impulses are considered as match. However, due to some limitation from the actual environment, there may be sometime a tiny difference between these two synchronous impulses. Thus, when considering this kind of issue about tiny difference, the optical disc drive will set a window 204 with length of w, where w>t, according to the predetermined synchronous impulse 202, so as to improve the tolerance during comparing the synchronous impulses. So, the data synchronous impulse 212 is compared with the window 204. When the data synchronous impulse 212 appears inside the window 204, it can be considered as a match between the predetermined synchronous impulse 202 and the data synchronous impulse 212.

Figure 3:
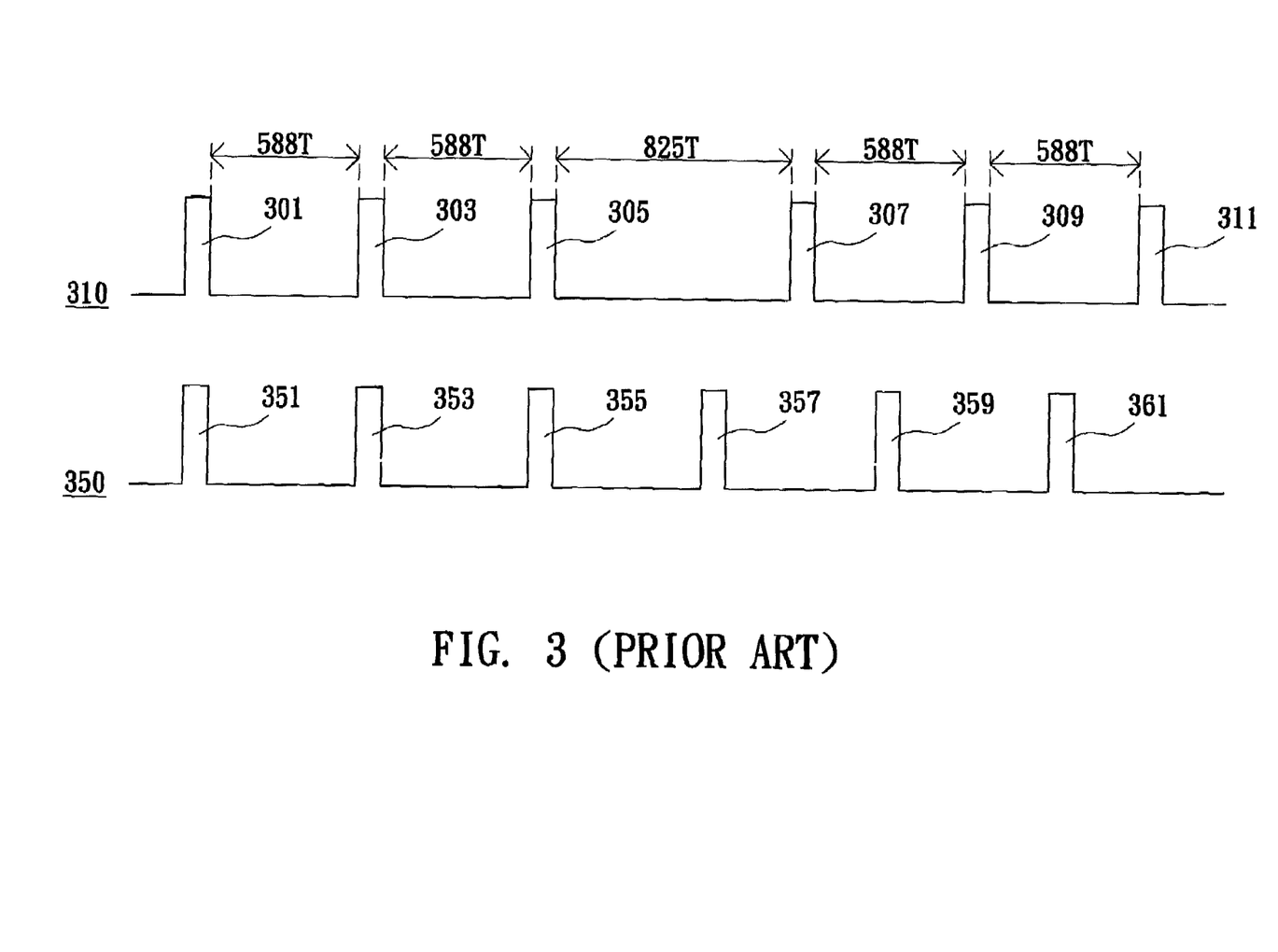
FIG. 3 illustrates the waveform for the synchronous signal of the optical disc with the data gap.

However, in the case of a data gap on the optical disc recorded by BURN-Proof technology, even if the window is adjusted for increasing the tolerance of the error, it is still not able to make sure that the predetermined synchronous impulse for the optical disc drive always matches with the data synchronous impulse for the data on the optical disc. Referring to FIG. 3 that illustrates the waveform for the synchronous signal of the optical disc with the data gap. The data synchronous signal 310 with respect to the optical disc data includes the synchronous impulses 301, 303, 305, 307, 309 and 311. Since the data gap is located between the data synchronous impulse 305 and the data synchronous impulse 307, the abnormal distance between the data synchronous impulse 305 and the data synchronous impulse 307 will be greater than the normal distance (588 T) between the other data synchronous impulses. For example, the abnormal distance is 825 T. Then, the synchronous signal 350 for the optical disc drive includes the synchronous impulses 351, 353, 355, 357, 359, and 361. The optical disc drive will compare these synchronous impulses sequentially to check whether or not they match to the data synchronous impulses 301, 303, 305, 307, 309 and 311.

As shown in FIG. 3, only three predetermined synchronous impulses match with the data synchronous impulses. After the fourth synchronous impulse, all of the comparison results will not match. This is because the data synchronous impulse 307 is unexpectedly delayed after the data synchronous impulse 305 due to the data gap, but the optical disc drive cannot detect the occurrence of this situation. In this situation, the predetermined synchronous impulse 357 of the optical disc drive appears at the point of 588 T after the predetermined synchronous impulse 355. This will cause that the synchronous impulses are not matched for the first time. After the data synchronous impulse 307, the distance between the following data synchronous impulse on the optical disc becomes normal again, but the optical disc drive can only detect the data synchronous impulse on the optical disc within the window of the synchronous impulse. In other words, the optical disc drive cannot detect the delayed data synchronous impulses after the data synchronous impulse 307. Therefore, the optical disc drive still sets the predetermined synchronous impulses, so that the predetermined synchronous impulses 357 of the optical disc drive and other following predetermined synchronous impulses, such as the predetermined synchronous impulse 359, 361, and so on, will not be able to match with the data synchronous impulses.

Taking the current optical disc drive as an example, when the number of the synchronous impulses not matched is not over a certain limit number, such as 30, then even if the synchronous impulses cannot be matched, data still can be decoded by EDC (error detection code) and ECC (error correction code). However, according to the above descriptions, when the optical disc recorded by Burn-proof is read, the number of the synchronous impulses not matched may possibly be over the upper limit number, and therefore it causes the difficulty for the optical disc drive in decoding/reading data.

SUMMARY OF THE INVENTION

It is therefore an objective of the present invention to provide an adjusting method for a synchronous signal in an optical storage device, so as to match the synchronous signal with respect to the data on the optical disc.

In accordance with the foregoing and other objectives of the present invention, the invention provides an adjusting method for a synchronous signal in an optical storage device. The optical storage device produces a predetermined synchronous signal. Normally the predetermined synchronous signal is matched with the data synchronous signal from the optical disc. The predetermined synchronous signal includes a number of predetermined synchronous impulses, and the data synchronous signal includes a number of data synchronous impulses. The method includes several steps as follows. First, a predetermined window is set according to a predetermined follows. First, a predetermined window is set according to a predetermined synchronous impulse when the predetermined synchronous signal is not synchronized with the data synchronous signal, and judging whether or not a first data synchronous impulse is located outside of the predetermined window. Then, if outside, when a second data synchronous impulse is detected apart from the first data synchronous impulse by a predetermined distance, then making the predetermined synchronous impulse matched with the second data synchronous impulse.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The present invention makes use of searching for whether or not a data synchronous impulse out side the predetermined window, is followed by a consecutive data synchronous impulse with a predetermined distance, and the predetermined synchronous impulse is adjusted according to the data synchronous impulse, so as to match the data synchronous impulse with the predetermined synchronous impulse. In order to further explain the features of the present invention, two preferred embodiments are provided for descriptions as follows.

First Preferred Embodiment

Figure 4A:
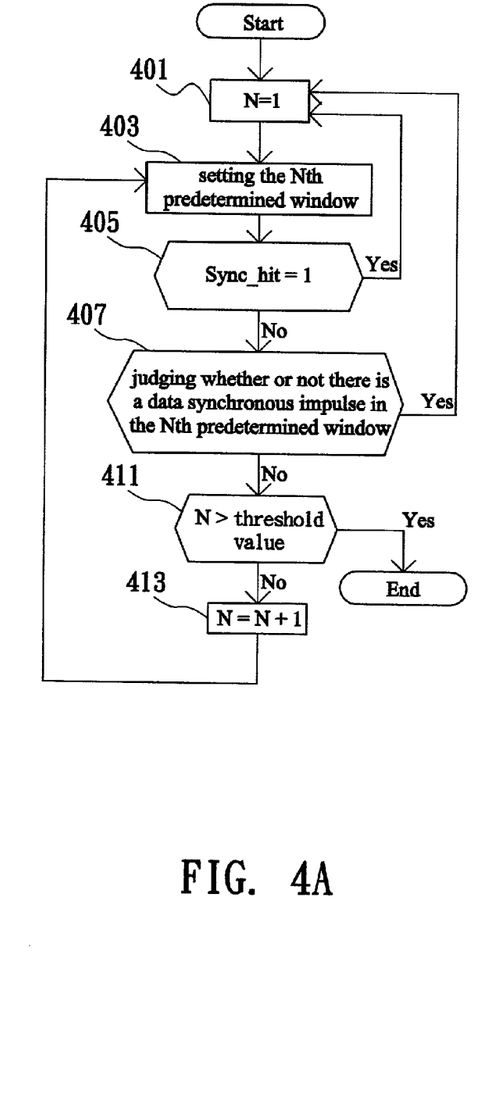
FIG. 4A schematically illustrates the method for adjusting the synchronous signal for the optical storage device, according to the first embodiment of the present invention.
Figure 4B:
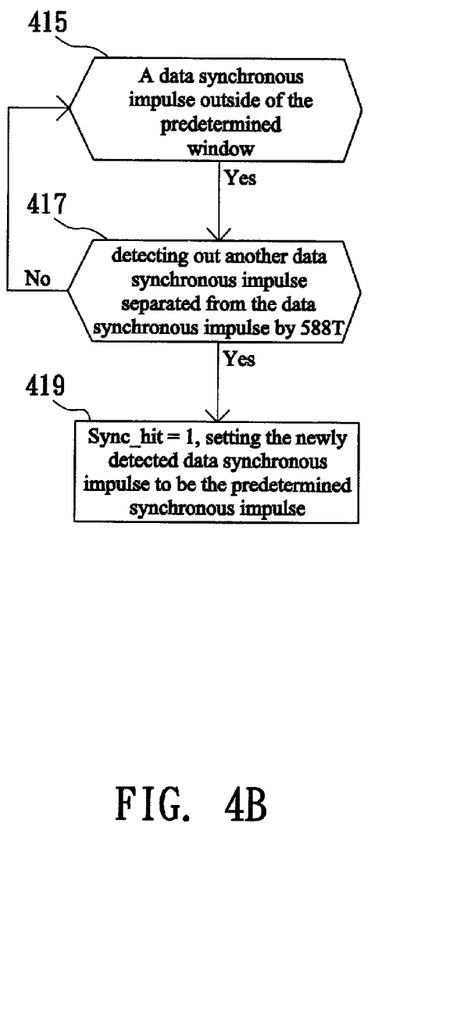
FIG. 4B schematically illustrates the method for adjusting the synchronous signal for the optical storage device, according to the first embodiment of the present invention.

Referring to FIGS. 4A and 4B that schematically illustrate the method for adjusting the synchronous signal for the optical storage device, according to the first embodiment of the present invention. First, referring to FIG. 4A, in the step 401, a natural number N is defined, wherein N represents the order number when the match action is performed for the synchronous impulses. At the beginning, N is set to 1. After the method is initiated, the first synchronous impulse produced by the optical disc drive is defined as the first predetermined synchronous impulse. In the step 403, the optical disc drive will set a Nth predetermined window according to the Nth predetermined synchronous impulse. For example, when N is 1, then the optical disc drive will accordingly set a first predetermined window. The length of the predetermined window is determined or changed by the user. Then, in the step 405, it is determined whether or not the sync hit signal sync_hit is 1. When the sync_hit is 1, it represents that the data synchronous impulse is matched with the predetermined window. On the contrary, when the sync_hit signal is set to 0, it represents that the predetermined synchronous signal of the optical disc drive and the data synchronous signal of the data on the optical disc cannot be matched. About how to determine the sync_hit signal in the present invention will be described later in detail. In the case that the sync_hit signal is 1, then the process goes back to the step 401. In the case that the sync_hit signal of the synchronous impulse is 0, then the process goes to the step 407.

Afterward then, the optical disc drive will activate a state machine to compare the Nth predetermined window with the data synchronous signal of the data on the optical disc so as to judge whether or not the corresponding data synchronous impulse is within the Nth predetermined window. The way of comparison is that the synchronous impulse appearing earliest in the data synchronous signal is treated as the first data synchronous impulse, and it is determined whether or not a data synchronous signal is within the Nth predetermined window. As described in the step 407, the optical disc drive will judge whether or not the data synchronous signal matches with the first data synchronous impulse, which is corresponding to the Nth predetermined window.

In the step 407, if the first data synchronous impulse is corresponding to the Nth predetermined window, then it indicates that the next predetermined synchronous impulses and the next predetermined window can be set according to the current predetermined synchronous impulse of the optical disc drive. Then, the flow goes back to the step 401. The next predetermined synchronous impulse can be set after the Nth predetermined synchronous impulse by a distance of one image frame, such as 588 T. Also and, a new predetermined window can be set according to the next predetermined synchronous impulse.

If the first data synchronous impulse is not corresponding to the Nth predetermined window, it indicates that the predetermined synchronous signal of the optical disc drive is not matched with the data synchronous signal for data on the optical disc. At this situation, the process goes to the step 411. When the optical disc drive does not find a corresponding data synchronous impulse within the current predetermined window, the optical disc drive will repeatedly perform the action of comparison until a data synchronous impulse is detected within the predetermined window. But, this recursive comparison may cause an abnormal operation in the optical storage device. So, it needs to set a threshold value for limiting the times of repeating the actions. The meaning for setting the threshold value is to prevent the optical disc drive from reducing the efficiency or a failure due to repeat of the foregoing searching method. Thus, in the step 411, the optical disc drive judges whether or not N is grater than the threshold value. If yes, the process is terminated. A data synchronous impulse that is detected later is defined as a new synchronous impulse. This also implies that some data will be missed, and then it causes the difficulty on reading data from the optical disc or even an access failure. If N is still not greater than the threshold value, then the process goes to the step 413.

In the step 413, N is updated (N=N+1). Then, the process goes back to the step 403. This means that the optical disc drive will set a next ((N+1)-th) predetermined synchronous impulse apart from the Nth predetermined synchronous impulse by 588 T. Also and, a (N+1)-th predetermined window is set according to the (N+1)-th predetermined synchronous impulse. When the data synchronous impulse is delayed due to the data gap, this data synchronous impulse will be outside of the predetermined window. Thus, the optical disc drive will activate a state machine, so as to check whether or not a data synchronous impulse is outside the predetermined window.

In the following descriptions, it will describe how to obtain the sync_hit signal for the synchronous impulse in the present invention. Referring to FIG. 4B, it should be noted that the processes shown in FIG. 4A and in FIG. 4B can be performed at the same time. However, in the case of the sync_hit signal being 1, if the process goes to the step 405, then the process will jump back to the step 401.

Thus, in the step 415, the optical disc drive will judge whether or not a data synchronous impulse from the optical disc is located outside of the Nth predetermined window (that also means this impulse is located between two predetermined windows). If no, then the step 415 is repeated until a data synchronous impulse is found between two predetermined windows, or until N is greater than the threshold value (at this time, the whole process is terminated). If one data synchronous impulse is found between two predetermined windows, then the process goes to the step 417.

When the data synchronous impulse is found within the predetermined window, in order to make sure that this data synchronous impulse is delayed due to the data gap, it is therefore necessary to judge whether or not a next data synchronous impulse appears at a later distance from the current data synchronous impulse by one image frame (588 T). If yes, then this data synchronous impulse can be surely considered as being delayed due to the data gap. If not, then it is necessary to again search for a next data synchronous impulse delayed due to the data gap. It means that the process goes back to the step 415. Therefore, in the step 417, it is judged whether or not a second data synchronous impulse appears at a distance from the first data synchronous impulse of the data on the optical disc by 588 T. If not, then the process goes back to the step 415. If yes, then the process goes to the step 419.

When it is checked that the first and the second data synchronous impulses are separated by one image frame (588 T), the predetermined synchronous impulses of the optical disc drive is adjusted according to these two data synchronous impulses, so as to make the predetermined synchronous impulse to be matched with the data synchronous impulse. Therefore in the step 419, the sync_hit signal is set to be 1 (this represents that a new data synchronous impulse with the property of regular period is detected, and therefore the predetermined synchronous impulse can be matched with the data synchronous impulse). Then, the predetermined synchronous impulse is adjusted to synchronize with the data synchronous impulse (or in other words, the second data synchronous impulse, which appears with the regular period, is treated as the new predetermined synchronous impulse).

Figure 5:
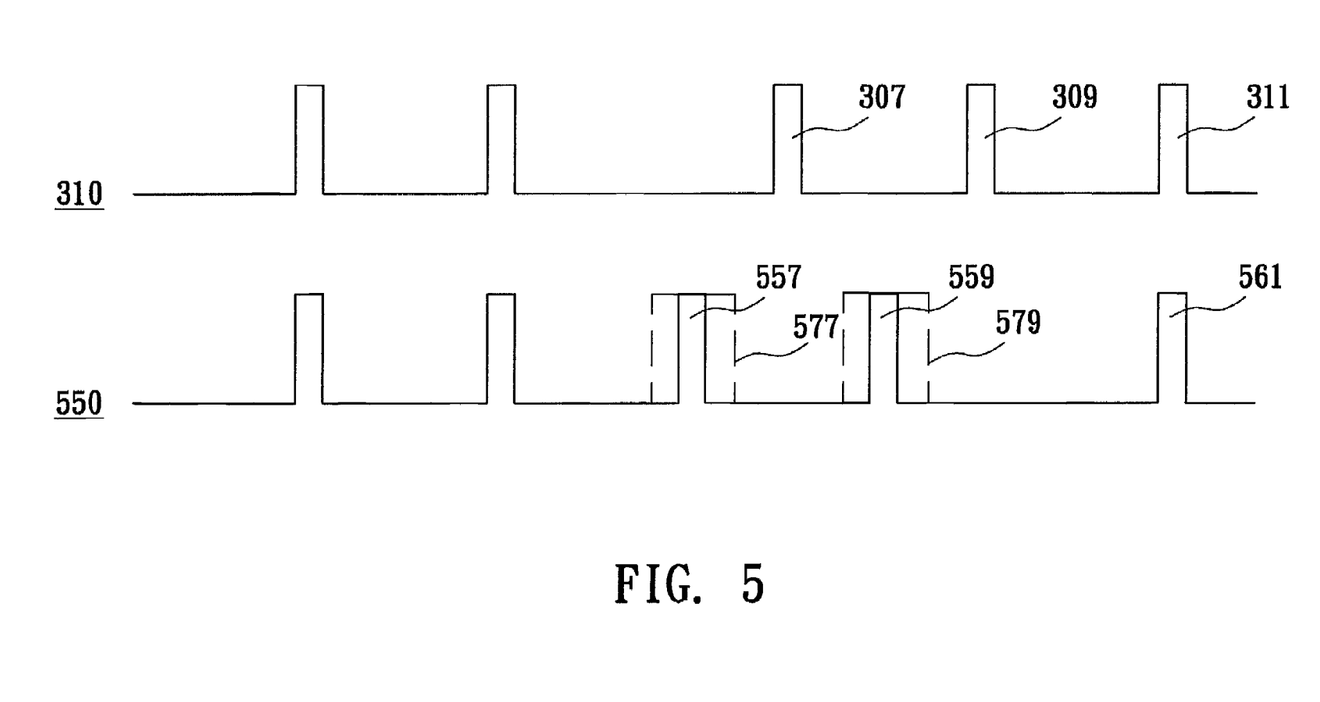
FIG. 5 schematically illustrates the method to solve the problem for the synchronous impulses not being matched as described in FIG. 3, according to the embodiment of the present invention.

Referring to FIG. 5 that schematically illustrates the method to solve a mismatch problem of the synchronous impulses according to a first embodiment of the present invention. In FIG. 5, a data synchronous signal 310 and a predetermined synchronous signal 550 are shown. Also referring to FIG. 4 at the same time. First, N is set to 1. The predetermined synchronous impulse 577 is defined as a first predetermined synchronous impulse 557, and a first predetermined window 577 is set according to the predetermined synchronous impulse 557. Then, it is judged whether or not a first data synchronous impulse is matched with the first predetermined window 577. If not, this means the data synchronous impulse 307 is delayed by a data gap. After then, since N (N=1) is smaller than the threshold value, a second predetermined window 579 is set according to the second predetermined synchronous impulse 559. After then, the first data synchronous impulse, the data synchronous impulse 307, is detected between the first predetermined window 577 and the second predetermined window 579. After then, a second data synchronous impulse 309 appears at a distance after the data synchronous impulse 307 by one image frame (588 T). The optical disc drive predicts a next data synchronous impulse 311 according to the second data synchronous impulse 309, and adjusts the third predetermined synchronous impulse 561 to be matched with the data synchronous impulse 311.

The present invention is not only limited to the use for reading the optical disc rewritten by the BURN-Proof technology, but also the invention can be used to read the optical disc with data gap. In addition, the present invention can also increase the reading ability for the optical disc having defect. This is because when the optical disc drive is reading an optical disc having defect, it also does occur that the predetermined synchronous signal is not matched with the data synchronous signal. And, the method of the present invention uses the adjustment on the predetermined synchronous signal of the optical disc drive, so as to make it to be matched with the data synchronous signal of the optical disc. As a result, the reading ability of the optical disc drive can be improved.

Figure 6:
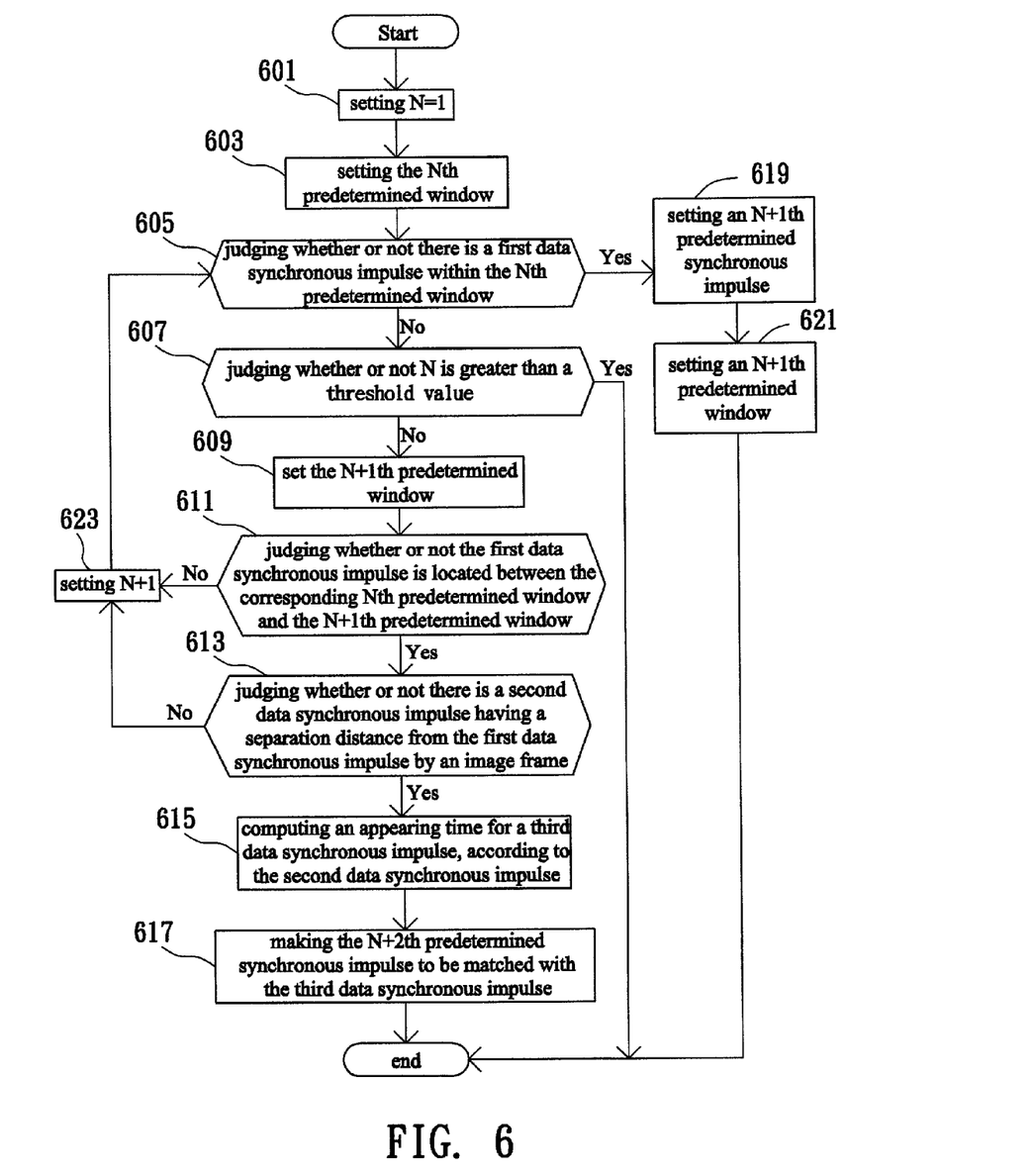
FIG. 6 schematically illustrates the method for adjusting the synchronous signal for the optical storage device, according to the second embodiment of the present invention.

Referring to FIG. 6 that schematically illustrates the method for adjusting the synchronous signal for the optical disc reading device, according to the second embodiment of the present invention. First, in the step 601, a natural N is defined. N represents the times that the match action is performed for the synchronous impulses. At the beginning, N is set to be 1. After the method begins, a first synchronous impulse produced by the optical disc drive is defined as a first predetermined synchronous impulse. In the step 603, a corresponding Nth predetermined window is set according to the Nth predetermined synchronous impulse. For example, when N is 1, a first predetermined window is set. After then, the Nth predetermined window is compared with the data synchronous signal of data on the optical disc, so as to judge whether or not there is a corresponding data synchronous impulse. The way to do it is that the synchronous impulse of the data synchronous signal that is first detected is considered as the first data synchronous impulse. Also and, searching the data synchronous signal is made to know whether or not a synchronous impulse appears within the Nth predetermined window. As shown in the step 605 it is judged whether or not the first data synchronous impulse is matched with the Nth predetermined window.

If the first data synchronous impulse is matched with the Nth predetermined window, then it indicates that a next (N+1)-th predetermined synchronous impulse and a (N+1)-th predetermined window can be set according to the Nth predetermined synchronous impulse of the optical disc drive, as shown in the steps 619 and 621. An (N+1)-th predetermined synchronous impulse is set after the Nth predetermined synchronous impulse by one image frame, such as 588T. The (N+1)-th predetermined synchronous window is set according to the (N+1)-th predetermined synchronous impulse. After that, the process goes to the end.

If the first data synchronous impulse is not matched with the Nth predetermine window, it indicates that the predetermined synchronous signal of the optical disc drive cannot be matched with the data synchronous signal of the data on the optical disc. Then, as shown in the predetermined synchronous signal of the optical disc drive needs to be adjusted for matching with the data synchronous impulse. When there is no a corresponding data synchronous impulse within the current predetermined window, the optical disc drive will repeatedly perform the comparison action until the corresponding data synchronous impulse within the current predetermined window is found. It is therefore necessary to set the threshold value for the times of repeating the comparing action. Then, in the step 607, it is checked whether or not N is greater than the threshold value. If yes, then the process goes to the end. If not, then the process goes to the step 609.

In the step 609, an (N+1)-th predetermined synchronous impulse is set after the Nth predetermined synchronous impulse by a separation distance of 588 T, and an (N+1)-th predetermined window is set according to the (N+1)-th predetermined synchronous impulse. When the data synchronous impulse is delayed due to the data gap, the data synchronous impulse will appear out side of the predetermined window. Because of that, it is checked whether or not there is the data synchronous impulse outside the current predetermined window. Then, in the step 611, it is judged whether or not the first data synchronous impulse of the data on the optical disc appears between the Nth predetermined window and the (N+1)-th predetermined window. If not, the process goes to the step 623. N is added with 1, and the process goes back to the step 605, so as to repeatedly search for the data synchronous impulse. If yes, then the process goes to the step 613.

When the data synchronous impulse is found to be located between two predetermined windows, in order to make sure that this data synchronous impulse is delayed due to the data gap, it is judged whether or not the next data synchronous impulse appears from this current data synchronous impulse by 588 T later. If yes, it is sure that this data synchronous impulse is delayed due to the data gap. If not, then it needs to repeatedly search for the data synchronous impulse delayed due to the data gap. Thus in the step 613, it is judged whether or not a second data synchronous impulse on optical disc appears after the first data synchronous impulse by one image frame (588 T). If not, then the process goes to the step 623. If yes, then the process goes to the step 615.

When it is sure that the first and the second data synchronous impulses is separated by one image frame, the predetermined synchronous impulse can be adjusted according to these two data synchronous impulses, so as to adjust the predetermined synchronous impulse to be matched with the data synchronous impulse. As known, the distance between the data synchronous impulses is one image frame in the normal condition. In the step 615, when the third data synchronous impulse appears can be predicted according to the second data synchronous impulse. In the step 617, the predetermined synchronous impulse is adjusted so as to allow the (N+2)-th predetermined synchronous impulse to be matched with the third data synchronous impulse. At the last, the process goes to the end.

In summary for the foregoing descriptions, in both of the first preferred embodiment and the second preferred embodiment, the same principal are used to make the predetermined synchronous impulse to be matched with the data synchronous impulse. However, the second preferred embodiment is not limited only to read the optical disc, which has been rewritten by the BURN-Proof technology, and it can also be used to read other optical disc with any data gap, such as the optical disc rewritten by the Just-Link technology. In addition to these, the read ability for the optical disc with defect is still also capable of being improved.

The improve effect for the present invention is following:

In the present invention, as disclosed in the foregoing preferred embodiments about the adjusting method for the synchronous signal in the optical storage device, the synchronous signal of the optical storage device can be adjusted to be matched with the data synchronous signal of the data on the optical disc. In addition, it can also allow the optical storage device to successfully read other kind of optical disc with data gap. Further still, the read ability for the optical disc with defect, can be effectively improved. The invention is suitable for optical storage device, such as CD-ROM (compact-disk read only memory) drive, CD-R/RW (compact disk recordable/re-writable) drive, DVD-ROM (digital versatile disk read only memory) drive and the like.

The invention has been described using exemplary several preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An adjusting method for a synchronous signal in an optical storage device, wherein the optical storage device produces a predetermined synchronous signal corresponding to a data synchronous signal from an optical disc, the predetermined synchronous signal includes a plurality of predetermined synchronous impulses and the data synchronous signal includes a plurality of data synchronous impulses, the method comprising:
   (a) setting N, N being an integer;
   (b) setting an N-th predetermined window, according to an N-th predetermined synchronous impulse of the predetermined synchronous signal;
   (c) judging whether or not two consecutive data synchronous impulses separated by a predetermined distance are detected outside the Nth predetermined window;
   (d) if the result of the step (c) is yes, then setting the predetermined synchronous signal matched with the data synchronous signal detected in the step (c);
   (e) if the result of the step (c) is not, then judging whether or not a data synchronous signal is detected within the Nth predetermined window, if yes, then returning back to the step (a); and
   (f) if the result of the step (e) is not, then judging whether or not N is greater than a threshold value to determine the method is terminated or updating N and then returning to the step (a).

2. The adjusting method as recited in claim 1, wherein in the step (c), the predetermined distance is an image frame.

3. The adjusting method as recited in claim 1, wherein the optical disc is recorded according to a process in which recording is suspended when a buffer underrun occurs.

4. The adjusting method as recited in claim 1, wherein the optical disc has defect.

5. An adjusting method for a synchronous signal in an optical storage device, wherein the optical storage device produces a predetermined synchronous signal corresponding to a data synchronous signal from an optical disc, the predetermined synchronous signal includes a plurality of predetermined synchronous impulses and the data synchronous signal includes a plurality of data synchronous impulses, the method comprising:
   (a) setting N, N being an integer;
   (b) setting an N-th predetermined window according to an N-th predetermined synchronous impulse of the predetermined synchronous signal;
   (c) judging whether or not the first data synchronous impulse of the data synchronous signal is located outside of the corresponding Nth predetermined window, and if yes, then going to the step (d);
   (d) judging whether or not a second data synchronous impulse apart from the first data synchronous impulse by a predetermined distance is detected, and if yes, then making the second data synchronous impulse matched with the predetermined synchronous impulse, and setting a sync_hit signal enabled;
   (e) if the $sync_{hit}$ is not enabled, then judging whether or not a data synchronous impulse is matched with the Nth predetermined window; and
   (f) if matched, then going back to the step (a), or judging whether or not N is greater than a threshold value; if not, updating N and returning back to the step (b).

6. The adjusting method as recited in claim 5, wherein updating N includes a step of adding N by 1.

7. The adjusting method as recited in claim 5, wherein the optical disc is recorded by a process in which recording is suspended when a buffer underrun occurs.

8. The adjusting method as recited in claim 5, wherein the optical disc has defect.

9. A method for adjusting a synchronous signal in an optical storage device, wherein the optical storage device produces a predetermined synchronous signal corresponding to a data synchronous signal from an optical disc, the predetermined synchronous signal includes a plurality of predetermined synchronous impulses and the data synchronous signal includes a plurality of data synchronous impulses, the method comprising:
   (a) setting a predetermined window according to a predetermined synchronous impulse when the predetermined synchronous signal is not synchronized with the data synchronous signal, and judging whether or not a first data synchronous impulse is located outside of the predetermined window; and
   (b) if outside, when a second data synchronous impulse is detected apart from the first data synchronous impulse by a predetermined distance, then making the predetermined synchronous impulse matched with the second data synchronous impulse.

10. The method as recited in claim 9, wherein before the step (a), the method further comprise:
   (a1) when predetermined synchronous signal is synchronized with the data synchronous signal, setting a next predetermined synchronous impulse and a next corresponding predetermined window according to the current predetermined synchronous impulse.

11. The method as recited in claim 9, wherein in the step (a), the method further comprise:
   when the first data synchronous impulse is matched with the predetermined window, judging the predetermined synchronous signal and the data synchronous signal to be synchronized.

12. The method as recited in claim 9, wherein the optical disc is recorded by a process in which recording is suspended when a buffer underrun occurs.

13. The method as recited in claim 9, wherein the optical disc has defect.

* * * * *